United States Patent [19]

Obermeier

[11] Patent Number: 5,732,522
[45] Date of Patent: Mar. 31, 1998

[54] DEVICE FOR SHALLOW ANCHORING A MEMBER

[75] Inventor: Josef Obermeier, Peiting, Germany

[73] Assignee: Hilti Aktiengesellschaft, Schaan, Liechtenstein

[21] Appl. No.: 667,753

[22] Filed: Jun. 21, 1996

[30] Foreign Application Priority Data

Jun. 22, 1995 [DE] Germany .................. 195 22 618.6

[51] Int. Cl.$^6$ .................................................. E04B 1/38
[52] U.S. Cl. ................... 52/698; 52/704; 411/60; 411/55
[58] Field of Search .................... 52/698, 704, 713, 52/714; 411/107, 166, 60, 61, 55

[56] References Cited

U.S. PATENT DOCUMENTS

| | | | |
|---|---|---|---|
| 1,451,999 | 4/1923 | Perry | 411/166 X |
| 2,563,164 | 8/1951 | Fletcher. | |
| 2,719,747 | 10/1955 | Layne | 411/55 X |
| 5,081,811 | 1/1992 | Sasaki | 52/713 X |
| 5,441,372 | 8/1995 | Wilkinson | 411/60 |
| 5,548,939 | 8/1996 | Carmical | 52/704 X |

*Primary Examiner*—Creighton Smith
*Attorney, Agent, or Firm*—Anderson, Kill & Olick, P.C.

[57] ABSTRACT

A device for shallow anchoring a member to a surface of a receiving material, particularly a receiving material with reinforcement close to the surface, includes a hollow cylindrically shaped anchoring member with a load engagement member connected to it for holding the member to be anchored. The anchoring member is formed of two axially extending cylindrically shaped hollow sleeves (5, 6) fitted one within the other. At least one of the sleeves has axially extending expandable slots. The sleeves are formed of an inner sleeve (5) and an outer sleeve (6) with the inner sleeve (5) having an outer diameter (a) and the outer sleeve having an inner diameter (i) with these diameters increasing towards the leading ends of the sleeves, that is, the ends inserted first into an annular bore in the receiving material.

13 Claims, 2 Drawing Sheets

DEVICE FOR SHALLOW ANCHORING A MEMBER

BACKGROUND OF THE INVENTION

The present invention is directed to a device for the shallow anchoring of a member, such as a construction member, to the surface of a receiving material, in particular a reinforced material.

In anchorages, where the security is important in the region, as a rule, anchoring members are used having a relatively great setting depth of 90 millimeters in the receiving material. Depending on the character of the receiving material, difficulties can arise in the course of drilling deep receiving bores. Particularly, in reinforced receiving materials, such as reinforced concrete with a high density of reinforcing material, it is possible that the drilling member may strike the reinforcing steel. Since it is not desirable to sever reinforcement in the receiving material, generally, another borehole is drilled where the reinforcing material has been struck, to move the location of the anchorage. Often, however, it is impossible to move the location of the anchorage at a particular point to avoid contacting the reinforcing steel, therefore, in such a case the reinforcement is cut.

Apart from the undesirability of cutting the reinforcement, it is also not advisable in applications requiring a high degree of security, since the completion of the receiving bore, where reinforcement is struck can only be effected with a great expenditure of effort. In the event reinforcement is struck, the drilling output with conventional drill bits drops considerably and it becomes necessary to use specialized tool bits, for instance, diamond tipped tool bits. This change in the type of tool bits used increases very considerably the expenditure for completion of the anchorage location. In addition, it may be necessary to provide additional support at the location of the severed reinforcement to restore the required strength of the receiving material in that region. If such additional effort is not expended, it may be necessary to reduce the load carrying values of the receiving material forming the anchorage in the region of the severed reinforcement.

SUMMARY OF THE INVENTION

Therefore, it is the primary object of the present invention to provide a device for locating anchorage points in reinforced receiving material without the need to cut the reinforcement. The device permits the desired anchorage points to be maintained even if reinforcement is struck during the drilling operation. Further, a device is provided for use in regions having high security requirements and it is possible to achieve anchorages with sufficiently higher retention values. Subsequent expensive reconstruction of the receiving material forming the anchorage for restoring its strength can be avoided.

Therefore, in accordance with the present invention, a device is provided for the shallow anchoring of members to a receiving material, that is, where the device affords anchoring close to the surface of the receiving material. Such a device is particularly important for anchoring members to the surface of the reinforced receiving material, where the device comprises an essentially hollow cylindrical anchoring member with a load engagement member connected to it. The anchoring member is formed of two parts and comprises two essentially hollow cylindrical sleeves which can be pushed one inside the other with cone-like surfaces contacting one another, with at least one of the two sleeves having widenable axially extending slots. The inner sleeve has an outside diameter and the outer sleeve has an inside diameter with such diameters increasing in the direction in which the device is set into the receiving material. The inside surface of the inner sleeve and the outside surface of the outer sleeve provide the cylindrical configuration.

In placing or setting the anchoring device, the inner sleeve is inserted into an annularly shaped bore drilled in the receiving material forming the anchorage, for instance, by a hammer drill annular bit of a core-drilling crown bit. The anchoring of the device is effected by inserting the outer sleeve over the inner sleeve and driving the outer sleeve into the annularly-shaped bore. The wall thicknesses of the two sleeves are dimensioned so that their sum is oversized relative to the width of the bore drilled in the receiving material. Accordingly, the inner sleeve acts as an expansion sleeve and presses the outer surface of the outer sleeve, provided with axially extending slots, against the outer surface of the bore. The wall of the inner sleeve can also be slotted axially so that it presses against the inner surface of the bore. The anchoring is established by a frictional lock of the outer surface and possibly of the inner surface of the anchoring member against the corresponding outer and inner surfaces of the annularly shaped bore. This feature makes the anchoring surfaces distinctly greater than in conventional anchorages. Where both the inner and outer sleeves are provided with axially extending slots, the anchoring surfaces are nearly doubled. Due to such anchoring surfaces, the depth of the annularly-shaped bore can be made considerably smaller than in conventional receiving bores without impairing the retention or anchoring values. Accordingly, the anchorage point can be located in shallow regions where no reinforcement is located. In this way, the intended anchorage points can be retained where a conventional receiving bore has struck against reinforcing steel and where a conventional anchorage could only be set after the reinforcement has been severed.

The device of the present invention permits anchorage points, with adequate anchoring or retention values, to be located at any random locations in a receiving material having a high reinforcement density. If reinforcement is struck when drilling a bore for a conventional anchor, with the use of the device of the present invention it is not necessary to shift the anchorage point or to cut the reinforcement. With the use of the device of the present invention, the desired anchorage points can be used where reinforcing steel is stuck without the need to cut the reinforcement. Further, subsequent strengthening of the receiving material forming the anchorage is unnecessary. The strength of the receiving material is maintained and the permissible loading of the receiving material is not reduced.

It is advantageous for providing the desired loading value of the anchorage, if the inner and outer sleeves have a wall thickness along their axial lengths which supplement one another, whereby when one is pushed inside the other, the sleeves afford the anchoring member with a substantially constant wall thickness over the axial length of the anchoring member. Accordingly, it is assured that the inner surface of the inner sleeve and the outer surface of the outer sleeve bear against the corresponding surfaces of the annularly-shaped bore for their full axial length.

The frictional lock between the anchoring member of the present invention and the surfaces of the annularly-shaped bore can be supplemented by a positive lock, by providing the inner surface of the inner sleeve with radial projections at the leading end of the sleeve. When the outer sleeve is driven over the inner sleeve in the setting direction, the projections are pressed into the receiving material forming the anchorage and produce regions with an undercut.

It is preferable to arrange the radial projections so that they form at least one circumferentially extending annular bead at the inner surface of the inner sleeve. The cutting edge formed by the annular bead digs into the receiving material forming the anchorage and produces the undercut and the desired additional positive lock.

To prevent the outer sleeve from being driven too deeply into the annular bore and damaging the receiving material of the anchorage in the region of the bore, due to excessive expansion pressure, it is preferable if the outer sleeve is provided with a circumferentially extending collar at its trailing end.

In a preferred embodiment of the present invention, the engagement member is connected to the inner sleeve. As a result, the inner sleeve along with the load engagement member has a pot-like shape. The engagement region forming the pot base connects the anchoring member and the load engagement member to one another and provides the function of a depth stop, due to the abutment of the load engagement member with the surface of the receiving material forming the anchorage. This feature assures that the setting depth of the inner sleeve is constant even if the bore has been cut for too great a depth. The load engagement member is located at the center of the anchorage member, and extends axially outwardly from the receiving material. In this way, a uniform force introduction is achieved when the anchorage member is loaded affording a favorable effect on the obtainable retention values.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
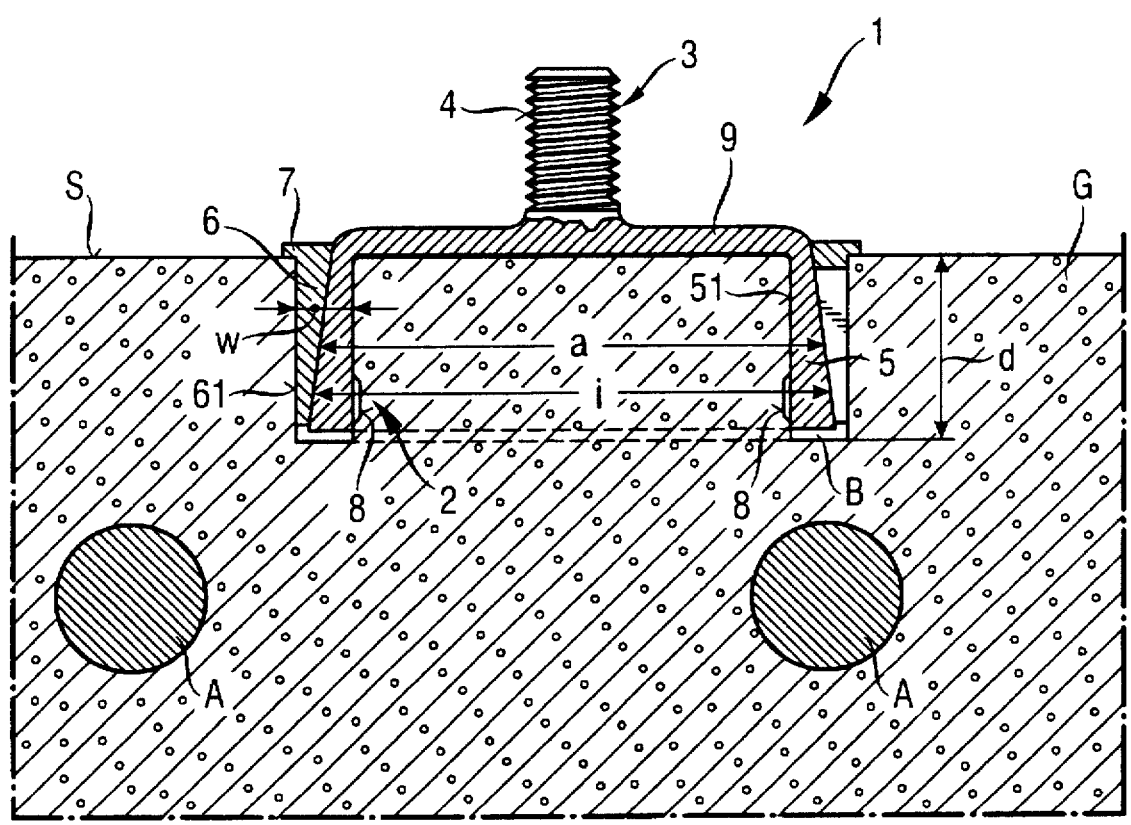
FIG. 1 is an axially extending sectional view to the device of the present invention set in a receiving material.

The embodiment illustrated in FIG. 1 displays an anchoring device 1 for securing a member, not shown, such as a construction member, close to the surface of a reinforced receiving material preferably reinforced concrete, having a high reinforcement density.

The anchoring device 1 has a hollow cylindrical anchoring member 2 and a load engagement member 3 connected to it. The load engagement member 3 can be formed as an anchor rod with an external thread 4, as shown in FIG. 1. As an alternative, in place of the anchor rod with the external thread 4, it would be possible to use a sleeve with an internal thread or some similar arrangement.

The anchoring member 2 is formed of two basically hollow cylindrical sleeves, one an inner sleeve 5 with an outer diameter a and an outer sleeve 6 with an inside diameter i with the sleeves arranged so that one sleeve fits into the other with the contacting surfaces each having a conical configuration. The inner surface of the inner sleeve 5 and the outer surface of the outer sleeve 6 are cylindrically shaped providing the anchoring member with its cylindrical configuration. In the telescoped arrangement of the inner and outer sleeves 5, 6, the inside diameter i of the outer sleeve 6 is essentially equal to or slightly greater than the outside diameter a of the inner sleeve 5. The outer surface of the inner sleeve 5 and the inner surface of the outer sleeve 6 are shaped so that their diameters (a, i) increase in the setting direction towards their leading ends, that is the ends first inserted into the annular bore. Accordingly, the wall thickness of the inner sleeve 5 increases towards its leading end and the wall thickness of the outer sleeve 6 decreases towards its leading end. The wall thicknesses of the inner and outer sleeves 5, 6 are matched to one another so that when the outer sleeve is pushed over the inner sleeve, the anchoring member 2 has a substantially constant wall thickness W over its full axial length. The outer sleeve 6 and possibly the inner sleeve 5 are provided with axially extending slots which facilitate radial widenings.

To provide an anchoring point or location, the inner sleeve 5 of the anchoring device 1 is inserted into an annularly shaped bore B in the receiving material or anchorage G, the bore having previously been drilled by means of a hammer drill core bit or a core drilling crown. The anchoring of the device 1 in the bore B is effected by sliding the outer sleeve 6 in the setting direction over the inner sleeve 5 and driving the outer sleeve into the remaining annular gap formed by the bore B. The wall thicknesses of the two sleeves are dimensioned so that their sum has an oversized character relative to the radial dimension of the bore B. Accordingly, the outer sleeve 6 driven into the receiving material acts as an expansion sleeve and presses the inner surface 51 of the inner sleeve 5 against the radially inner surface of the bore B. The outer surface 61 of the outer sleeve 6 presses against the radially outer surface of the bore B. Anchoring is effected by the frictional lock of the inner and outer surfaces 51, 61 of the anchoring member 2 against the corresponding inner and outer surfaces of the bore B. This arrangement permits roughly a doubling of the anchoring surfaces compared to conventional anchors of the same setting depth. The large anchoring surfaces permit the depth or axial dimension of the annular shaped bore B to be smaller compared to conventional receiving bores, without otherwise impairing the retention values. As a result, the anchorage locations can be maintained at a shallow depth, that is, near the surface of the receiving material where there is no reinforcing steel A.

The outer sleeve 6 has a circumferentially extending collar 7, as shown in FIG. 1, projecting radially outwardly from its outer surface and serving as a depth stop at the surface S of the receiving material G. This feature assures that the outer sleeve 6 is not driven to an excessive depth in the case where the bore B has been drilled too deeply where it would exert an excessive expansion force on the walls of the bore, which could result in damage to the receiving material G forming the anchorage. The circumferentially extending collar 7 can also serve as an assist for driving the outer sleeve 6 into the bore B by applying a setting tool to the surface of the collar and subjecting the tool to axial blows.

Figure 3:
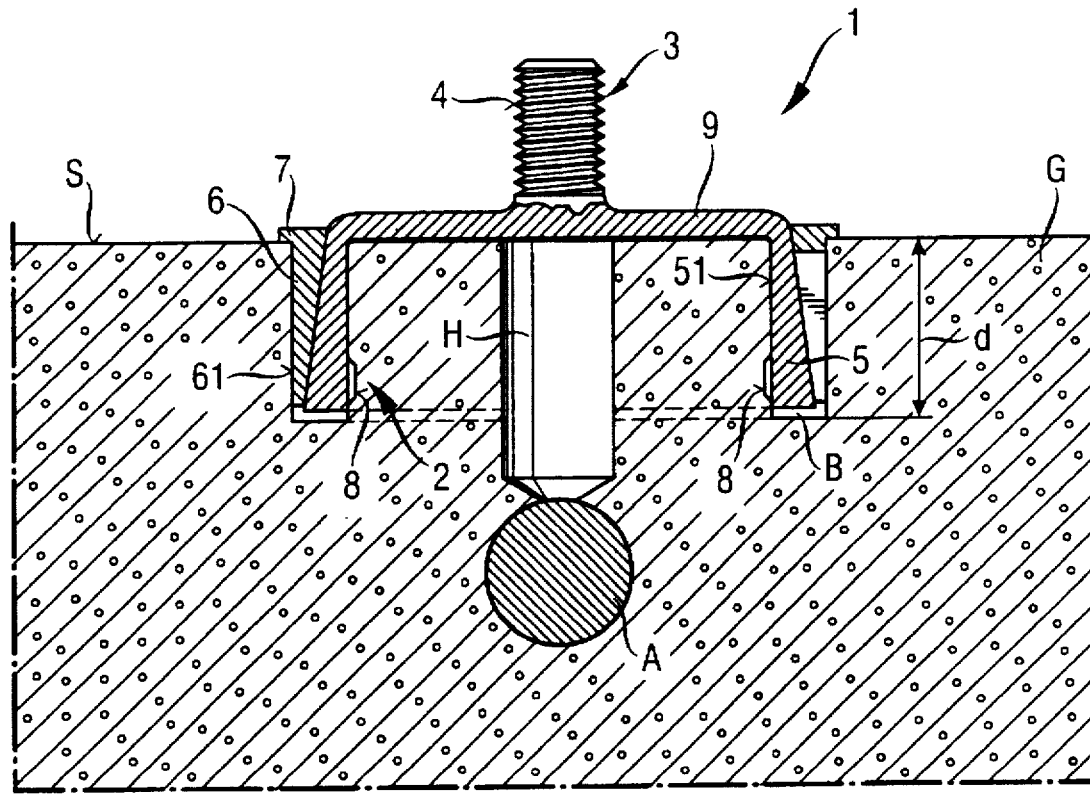
FIG. 3 is an axial sectional view of the anchorage point of the receiving bore illustrated in FIG. 2 along with the positioning of the device of the present invention.

As shown in FIGS. 1 and 3, radially inwardly directed projections 8 are located adjacent to the leading end of the inner surface 51 of the inner sleeve 5 and, in the expansion process, provide an undercut in the bore B and thereby assist the frictional lock by an additional positive lock. In an advantageous embodiment, the projections 8 are arranged on the inner surface 51 of the inner sleeve 5 so that they form at least one circumferentially-extending annular bead with a circumferentially extending cutting edge.

The expansion of the inner and outer sleeves 5, 6 in the bore B can be facilitated by providing one of the inner or outer sleeves, or both sleeves, with at least one axially extending slot extending at least for a part of the axial length of the sleeves.

The load engagement member 3 can be connected to the inner or outer sleeve 5, 6, preferably, as shown, it is connected with the inner sleeve 5 providing a pot-like shape. The connection section 9, forming the base of the pot-like shape, can bear against the outer surface S of the receiving material G forming the anchorage and thereby serving as a depth stop for the inner sleeve 5. The load engagement member 3 is located centrally relative to the inner sleeve 5 and extends axially outwardly opposite to the setting direction from the connecting section 9. This arrangement permits the introduction as uniformly as possible of traction and lateral forces into the receiving material G.

Figure 2:
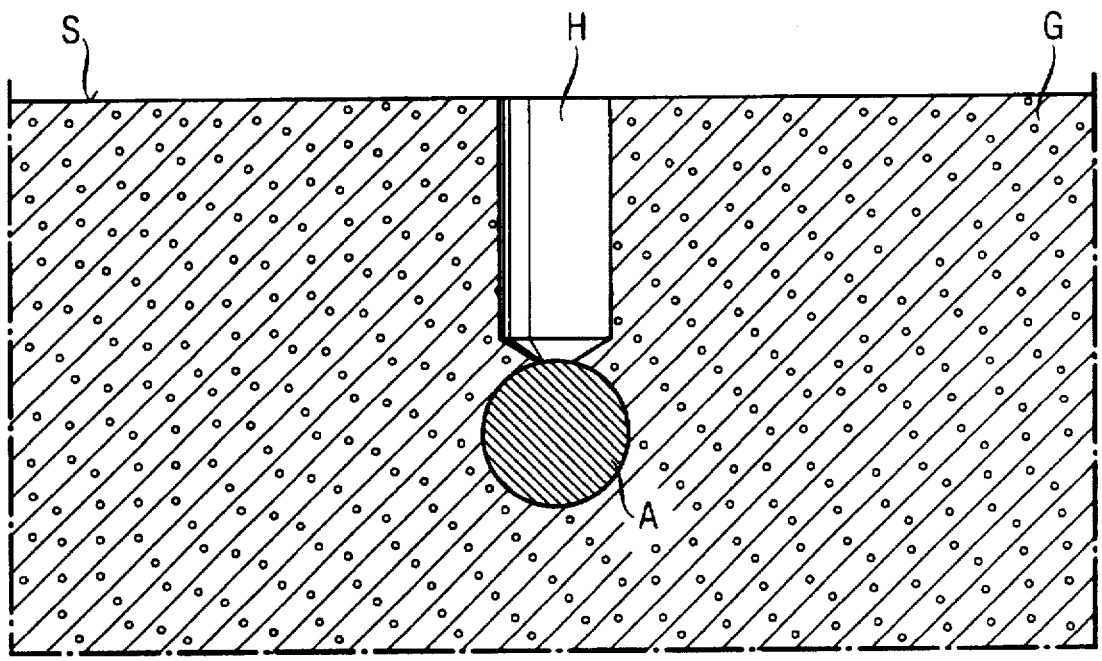
FIG. 2 is an axial section Of a receiving bore where reinforcing steel has been struck.

A preferred application of the anchoring device of the present invention is indicated in FIGS. 2 and 3. FIG. 2 shows a receiving bore H for a conventional anchor, where the bore ends when the drilling bit has struck a reinforcing steel member A located in the receiving material G. As a rule, it is undesirable to sever reinforcements, accordingly, the anchorage location must be shifted if a conventional anchor is used and a new bore must be drilled at another location in the receiving material. In a number of instances, however, it is impossible to shift the anchorage location. In such instances, the anchoring device 1 of the present invention affords an effective option, since it enables a reliable anchoring in the region of the receiving material where the device is located near the surface of the material, that is, where a shallow anchoring is effected. In FIG. 3, an annularly shaped bore B is produced by a hammer drill core bit or a core drilling crown, and is co-axial to the receiving bore H formed in FIG. 2. The annularly shaped bore B is drilled to a depth where it is assured it will not contact the reinforcing steel. Such typical depths are approximately 1.5 to 4 centimeters. The anchoring device 1 of the present invention is utilized in annularly shaped bores B and is anchored in a shallow region of the anchoring receiving material G, that is, where it is secured near the surface of the material. In this way, anchoring locations, where reinforcing steel has been struck, can be salvaged without having to cut the reinforcing steel.

The anchoring device of the present invention, permits the establishment of anchorage locations with adequate retaining values at any random location in receiving material having a high reinforcing steel density. Reinforcing steel struck when the receiving bores for conventional anchors are formed, do not require the anchorage locations to be shifted or the severing of the reinforcing steel. Due to the use of the device of the present invention, the desired anchorage locations can be located where the reinforcing steel has been struck, without cutting the reinforcing steel. Subsequent strengthening of the anchoring receiving material is no longer necessary. The strength of the anchoring receiving material is preserved and the permissible loading of the receiving material need not be reduced.

While specific embodiments of the invention have been shown and described in detail to illustrate the inventive principles, it will be understood that the invention may be embodied otherwise without departing from such principles.

We claim:

1. Device for shallow anchoring a member to a surface of a receiving material, such as a receiving material with reinforcement close to the surface, comprises a hollow cylindrically shaped anchoring member (2) and a load engagement member (3) connected to said anchoring member, said anchoring member (2) comprises an inner sleeve (5) and an outer sleeve (6), said inner sleeve and said outer sleeve each having an axial direction and a leading end to be inserted first into the receiving material and an opposite trailing end, one of said inner sleeve and said outer sleeve being connected at said trailing end with said load engagement member (3) by a connector section (3) extending transversely of the axial direction of said sleeves thus forming a pot-like shape with said load engagement member (3) being arranged coaxially with said sleeves, at least one of said inner and said outer sleeves (5, 6) having one axially extending slot therein, said inner and said outer sleeves each having an inner surface and an outer surface extending in axial direction and along a circumference of said inner and said outer sleeves, and said outer surface of said inner sleeve having a diameter (a) and said inner surface of said outer sleeve having a diameter (i) wherein said diameters (a, i) increase towards the leading ends thereof said inner and said outer sleeves being adapted for sliding into each other upon axial blows on a trailing end of one of said inner and said outer sleeves (5, 6), whereupon said outer surface of said inner sleeve (5) and said inner surface of said outer sleeve (16) are brought in intimate contact and in expanding cooperation.

2. Device, as set forth in claim 1, wherein said inner sleeve (5) and outer sleeve (6) each having a wall thickness in the axial direction complementing one another when the sleeves are to be inserted into an annular bore in the receiving material so that the wall thickness of the anchoring device (2) has a substantially constant wall thickness for the axial length thereof.

3. Device, as set forth in claim 1 or 2, wherein said inner surface (51) of said inner sleeve (5) having radially inwardly extending projections (8) adjacent the leading end thereof.

4. Device, as set forth in claim 1 or 2, wherein said outer sleeve (6) having a circumferentially extending collar (7) at the trailing end thereof.

5. Device, as set forth in claim 1 or 2, wherein said load engagement member (3) being connected to said inner sleeve (5).

6. Device, as set forth in claim 5, wherein said inner sleeve (5) and said load engagement member (3) being connected together by a connector section (9) extending transversely of the axial direction of said sleeves and forming a pot-like shape with said load engagement member (3) being arranged coaxially with said sleeves.

7. Device, as set forth in claim 1 or 2, wherein axially extending slots are formed in said outer sleeve (6).

8. Device for shallow anchoring a member to an outside surface of a receiving material, such as a receiving material with steel reinforcement close to the outside surface thereof, where the device is for securing in an axially extending annular bore formed inwardly from the outside surface of the receiving material and the bore having an axially extending radially inner surface spaced radially from a axially extending radially outer surface with the annular bore having a base for being spaced between the receiving material outer surface and the reinforcement, said device comprises a hollow cylindrically shaped anchoring member (2) and a load engagement member (3) connected to said anchoring member, said anchoring member comprises an inner sleeve (5) and an outer sleeve (6), said inner sleeve and outer sleeve each having an axial direction and a leading end to be inserted first into the annular bore in the receiving material and an opposite trailing end, one of said inner sleeve (5) and said outer sleeve (6) being connected at said trailing end with said load engagement member (3) by a connecter member (9) extending transversely of the axial direction of said sleeves, and forming a pot-shape with said load engagement member (3) being arranged coaxially with said inner and outer sleeves, at least one of said inner and said outer sleeves (5), (6) having one axially extending slot therein, said inner and said outer sleeves each having an inner surface and an outer surface extending in the axial direction and along a circumference of said inner and outer sleeves, said outer surface of said inner sleeve having a diameter (a) and said inner surface of outer sleeve having a diameter (i) wherein said diameters (a), (i) increase towards the leading ends thereof, said inner and said outer sleeves being arranged for sliding one over the other into said annular bore upon axial blows being directed against a trailing end of one of said inner and said outer sleeves (5), (6), whereupon said outer surface of said inner sleeve (5) and said inner surface of said outer sleeve (6) are brought into intimate contact and expanding cooperation, and said inner sleeve and said outer sleeve in combination being oversized relative to the annular bore whereby said inner sleeve has a radially inner surface in expanded contact with the inner surface of the annular bore and the outer sleeve has a radially outer surface expanded into contact with the outer surface of the annular bore.

9. Device, set forth in claim 8, wherein said inner sleeve (5) and outer sleeve (6) each having a varying wall thickness in the axial direction complementing one another when the sleeves are intended to be inserted and expanded in the annular bore in the receiving material so that the wall thickness of the anchoring device (2) has a substantially constant wall thickness along the axial length thereof between the trailing and leading ends thereof.

10. Device, as set forth in claims 8 or 9, wherein said inner surface (51) of the said inner sleeve (5) having at least one radially inwardly extending projection (8) adjacent the leading end thereof for effecting a positive lock with the inner surface of the annular bore.

11. Device, as set forth in claim 8 or 9, wherein said outer sleeve (6) has a radially outwardly projecting circumferentially extending collar (7) at the trailing end thereof for contacting the outer surface of the receiving material.

12. Device, as set forth in claim 8 or 9, wherein said load engagement member (3) being connected to said inner sleeve (5) at the trailing end thereof.

13. Device, as set forth in claim 8 or 9, wherein said at least one axially extending slot comprises axially extending slots formed in said outer sleeve between a collar on said outer sleeve and said leading end thereof.

* * * * *